United States Patent [19]

Gall

[11] Patent Number: 4,985,779
[45] Date of Patent: Jan. 15, 1991

[54] IMPROVED METHOD AND APPARATUS FOR GENERATING HALFTONE IMAGES

[75] Inventor: Winrich Gall, Klausdorf, Fed. Rep. of Germany

[73] Assignee: Intergraph Corporation, Huntsville, Ala.

[21] Appl. No.: 409,114

[22] Filed: Sep. 19, 1989

[51] Int. Cl.⁵ .................. H04N 1/23; H04N 1/40; H04N 1/411
[52] U.S. Cl. .................................. 358/298; 358/456
[58] Field of Search .............. 358/296, 298, 456, 495, 358/460, 75, 457; 346/108, 160, 76 L

[56] References Cited

U.S. PATENT DOCUMENTS

| 3,922,484 | 11/1975 | Keller . | |
|---|---|---|---|
| 3,997,791 | 12/1976 | Perriman et al. | 358/75 |
| 4,080,634 | 3/1978 | Schreiber | 358/298 |
| 4,149,183 | 4/1979 | Pellar et al. | 358/75 |
| 4,350,996 | 9/1982 | Rosenfeld | 358/75 |
| 4,413,286 | 11/1983 | Boston | 358/298 |
| 4,419,690 | 12/1983 | Hammes | 358/75 |
| 4,447,833 | 5/1984 | Sano et al. | 358/298 |
| 4,449,150 | 5/1984 | Kato | 358/456 |
| 4,456,924 | 6/1984 | Rosenfeld | 358/75 |
| 4,499,489 | 2/1985 | Gall et al. | 358/75 |
| 4,578,714 | 3/1986 | Sugiura et al. | 358/457 |
| 4,673,971 | 6/1987 | Ikuta et al. | 358/75 |
| 4,700,235 | 10/1987 | Grall | 358/298 |
| 4,707,709 | 11/1987 | Tsilibes . | |
| 4,727,430 | 2/1988 | Miwa | 358/298 |
| 4,825,298 | 4/1989 | Ikuta et al. | 358/298 |

FOREIGN PATENT DOCUMENTS 59-1897 10/1984 Japan .

Primary Examiner—Bruce A. Reynolds
Assistant Examiner—Scott Rogers
Attorney, Agent, or Firm—Bromberg & Sunstein

[57] ABSTRACT

An improved method and apparatus for generating halftone images using a beam of variable intensity. A look-up table that is accessed, at a minimum, by position coordinates and image intensity data provides beam intensity information. In certain embodiments, the look-up table may be accessed by dot set identification data and/or randomly generated numbers in addition to the position coordinates and the image intensity data. The position coordinates (x,y) may be generated by performing a coordinate transformation on the beam position coordinates (u,v). The beam intensity data stored in the look-up table may permit the formation of soft dots, i.e. halftone dots that are formed by different levels of beam exposure. The look-up table also permits an increase in dot frequency in the middle tones.

22 Claims, 5 Drawing Sheets

IMPROVED METHOD AND APPARATUS FOR GENERATING HALFTONE IMAGES

DESCRIPTION

1. Technical Field

The invention relates to a method and apparatus for producing a halftone reproduction of a picture by exposing an output medium to a beam of varying intensity.

2. Background Art

Halftone image generators may be used in the production of color separations. In accordance with common procedures, a picture is scanned by a traversing scanning head as the picture is rotated on a cylinder, to obtain color separation signals obtained respectively, for example, through red, blue, and green filters. The signals are then corrected on a color computer to derive corrected picture signals for each color. The signals are used to determine the size of the dots necessary, for that particular region being scanned, to create the halftone image produced on the output medium. High tonal densities in the picture require for their synthesis large dots in the halftone dot pattern on the output medium.

A halftone dot pattern generally consists of repeated rows of dots, the rows making an angle known as the screen angle with the direction of motion of the output surface relative to the recording heads. The screen angle in the simplest case is 0° when the rows of dots are aligned with the axis of the cylinder around which is fixed the output medium. Preferably, though, different color separations are given different screen angles, to avoid, or at least minimize, the unsightly moiré patterns in the final image when all the colored dot patterns are superimposed.

Today most printed color images are achieved by consecutive printing of four partial images in halftone in the basic colors yellow, magenta, cyan and black. These four partial images are printed using four printing forms, one for each of the respective colors. The halftone images on these printing forms are obtained as described above, using screen nets that are rotated with respect to each other in order to avoid moiré. Each screen net consists of periodic repetitions of a screen mesh, each mesh typically defining the location of a single screen dot. The number of screen meshes per unit of distance is termed the "screen frequency". The screen dots may vary in size, and the size controls the amount of ink printed on the paper at the screen dot's location. Hue, saturation, and intensity of a color experienced in a print are therefore controlled by the different screen dot sizes on the printing forms.

Usually the printing forms are made in a copying process using color separation films. These color separation films are often made using electronically controlled film recorders. However, there are also electronically controlled recorders that directly expose printing forms using digital data. Both film and direct recording devices may be drum or flatbed devices.

A color separation is exposed by causing one or more radiation beams, each of which can be controlled in intensity, to scan the beam's target spot element by picture element, thus forming a line in the u-direction, and line by line in the v-direction, over a radiation-sensitive surface. Usually a film is used as the radiation-sensitive surface and light as the radiation. The light is often generated by a laser. Use of light-emitting diodes is also known.

The individual line consists of exposure dots formed at successive positions occupied by the beam's target spot when the beam is turned on. The spacing of these exposure dots in the u-direction is the distance traversed by the target spot between successive beam-off, beam-on decisions. In the v-direction the spacing between exposure dots is governed by the distance between successive scan lines of the beam's target spot. It is possible for the exposure dots to overlap one another in both the u- and v-directions.

The individual screen dot consists of one or more of these exposure dots. Depending on how many of these exposure dots are exposed and how they are located relative to each other, different sizes of screen dots can be generated. The ratio of the exposed (black) area inside a screen mesh to the total screen mesh area is called the "dot size", and is expressed in percent.

Several methods of generating rotated screen nets have been proposed and U.S. Pat. Nos. 4,084,183 and 3,657,472 describe a system of screens, each having a screen angle that has a rational tangent. The frequencies of the screens may differ from one another to avoid moiré when all four colors are printed one over the other. Usually screen angles of 0°, 18.43°, −18.43° and 45° are used. Although U.S. Pat. 4,084,184 pertains to a system of rational tangent screens at multiple angles, there is little detail in this reference as to how the individual screened halftone images are created, and the production of soft dots is not addressed. It is also known, in a system restricted to beam-off, beam-on control and rational tangent screening, to utilize a binary lookup table arrangement addressed by unrotated u-v coordinates and picture intensity values.

In most cases, however, the printing industry uses screen angles of 0°, +15°, −15° and 45° and identical screen frequencies for all screens. Nevertheless, the rational tangent systems can be used in many cases, even though they have a greater tendency of showing unusual patterns than is the case with the traditional angles of 0°, +15°, −15°, and 45°.

Methods of generating color separations with screen nets of arbitrary screen angles and screen frequencies are known as well. U.S. Pat. No. 4,499,489 describes one method. According to this method, the screen meshes in the rotated screen net are subdivided into a number of microdots, addressed by positions on x-y coordinate axes that are parallel to the sides of the meshes forming the rotated screen net. Using the u-v coordinates of the exposure dot to be exposed, the x-y-coordinates of the microdot close to this exposure dot are calculated. The screen net therefore consists of a high number of screen meshes aligned in the x- and y-directions and each typically defining one screen dot.

According to U.S. Pat. No. 4,499,489 the decision about exposure or non-exposure of the film at the location of an exposure dot depends on the result of a greater-smaller comparison between the image value representing the desired dot size and the function value R of a screen function $R=f(x,y)$, which is periodic in two dimensions and has periods equal to the dimensions of the screen mesh in the x- and y- directions.

At this point, it is important to distinguish between exposure dots and microdots. The exposure dot is the physical dot that is or is not to be generated by the radiation beam on the film. The size of the exposure dot depends on the optical, temporal, and mechanical behavior of the exposing system. The microdot, on the other hand, is an arithmetic value. Its size results from the number of subdivisions of the screen mesh in both directions necessary to represent the screen function R=f(x,y) with sufficient accuracy. The exposure dot and the microdot may, but need not, have the same size.

The method taught in U.S. Pat. No. 4,499,489 in practice leads to a number of deficiencies. As the single exposure dot can be exposed only in either its full intensity or not at all, the resulting screen dots will show a sharp decline in their optical density on their edges. These screen dots are called "hard dots" in the industry. Their disadvantage is that after exposure and developing of the film the size of these dots can be changed by chemical etching only in a very limited amount. Chemical etching, however, is desireable in order to modify the color separation to slightly change colors according to the customer's desires before printing.

Furthermore, as every exposure dot decision is made according to the result of a greater-smaller comparison between the picture intensity and the screen function R=f(x,y), the dot shape for a given picture intensity value at a certain location of the film can differ, from the screen dot shape for the next picture intensity value at the same location, only by the addition of zero or more exposure dots to the smaller screen dot. These considerations impose limitations on the possible kinds of functions R=f(x,y) that can be used in systems of this type. One requirement is that the function be single-valued. Typically screen dot size is a monotonically increasing function of picture intensity. One system, restricted to the generation of hard dots, that attempts to avoid these limitations is disclosed in U.S. Pat. No. 4,825,298. In that system, there is superimposed an additional set of constraints, which may be implemented in a lookup table, on the binary on-off decision for each exposure dot.

SUMMARY OF THE INVENTION

The invention provides an improved apparatus and method for generating a halftone having a desired screen angle and screen frequency. It is applicable to a recording means having a radiation beam of variable intensity, aimed at a target spot on a recording medium. The target spot is moved relative to the recording medium in first and second directions defining a first coordinate system. In a preferred embodiment, the recording medium is divided into a number of periodically repeating screen meshes forming a net on which locations are defined by a second coordinate system. One of the coordinates is disposed at an angle with respect to the first recording direction. Each of the screen meshes is divided into a number of microdots, and the position of the target spot in coordinates of the second coordinate system is determined as a function of its position in the coordinates of the first coordinate system. In accordance with a preferred embodiment of the invention, a lookup table contains, at addressable locations, output data defining the desired intensity of the radiation beam as a function of input information that defines an address in the table. The input information includes picture intensity data and relative coordinates related to the second coordinates. The output data of the lookup table are used to affect the intensity of the radiation beam.

BRIEF DESCRIPTION OF THE DRAWINGS

The foregoing features of the invention may be more readily understood by reference to the following detailed description taken with the accompanying drawings, in which:

FIG. 3 illustrates, for a screen mesh having 8x8 microdots, the contents of a portion of a sample look-up table in accordance with the invention at three different picture intensity values and the set of dots resulting from such values;

DETAILED DESCRIPTION OF SPECIFIC EMBODIMENTS

Figure 1:
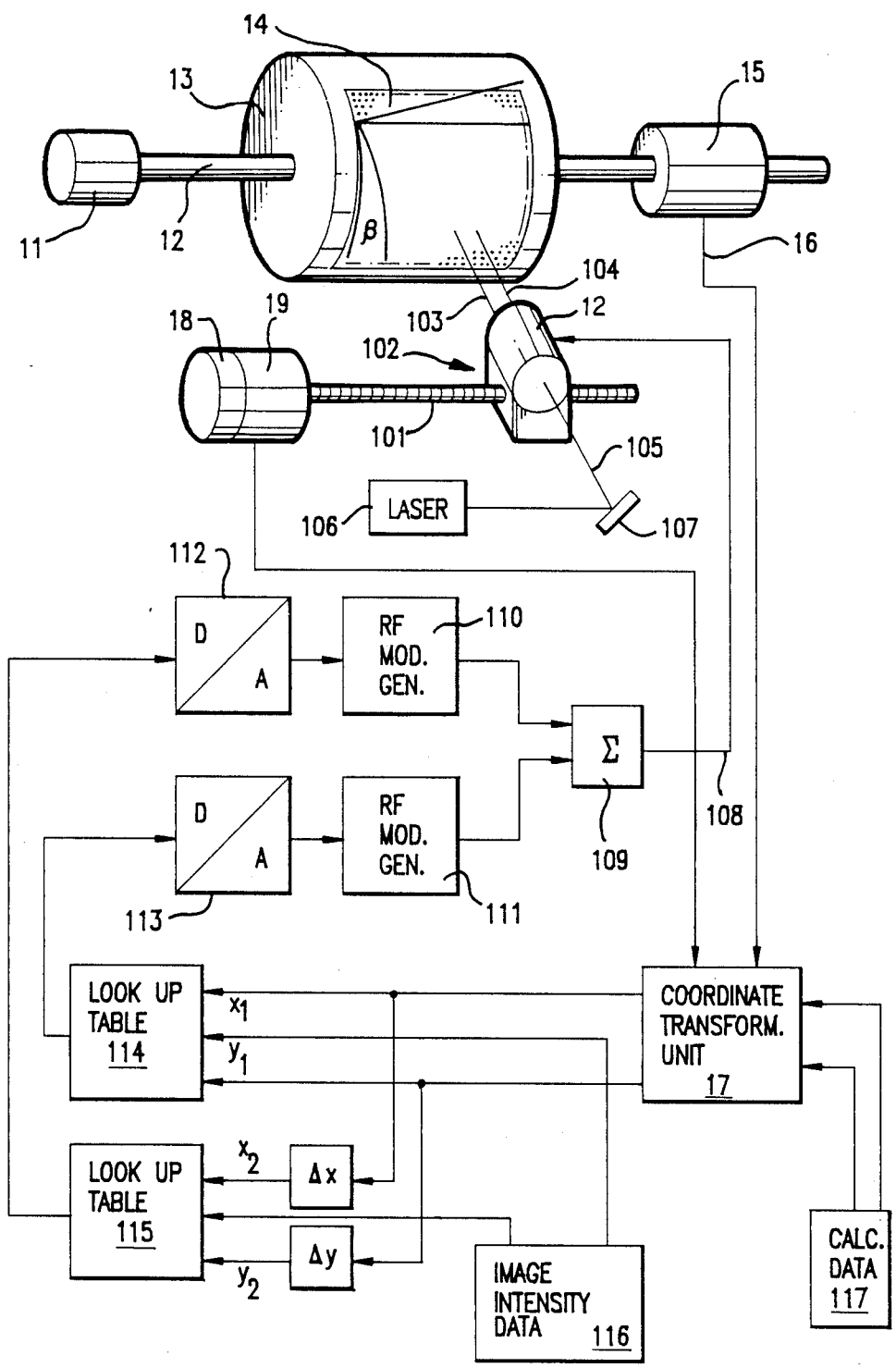
FIG. 1 is a block diagram of a preferred embodiment of an apparatus for generating halftone images in accordance with the invention.

FIG. 1 presents a block diagram of a preferred embodiment of an apparatus for generating halftone images in accordance with the invention. A drum recorder, which may be conventional, includes a drum 13 that is rotationally driven by motor 11 via shaft 12. The angular orientation of the drum 13 is tracked by incremental shaft encoder 15, which provides clock signals related to u as the drum is rotated. Mounted on the drum 13 is film 14. Light beams 103 and 104 emanate from recording head 102, and each produce on film 14 a separate target spot, which is moved relative to the film in the u direction by motor 11 and in the transverse direction by motor 19 via lead screw 101. Positional information in this transverse direction is obtained by shaft encoder 18, which provides clock signals related to v as the lead screw 101 is rotated. (Alternatively motor 19 may be a stepper motor, and positional information may be provided by directly tracking pulses on the stepper motor's input.)

The recording head 102 includes an acousto-optical modulator 12 that forms the two beams 103 and 104 from the single beam 105 provided to it as an input from laser 106 via mirror 107. The laser 106 may also be a laser diode, and the term "laser" in connection with the invention includes laser diode. The acousto-optical modulator angularly displaces beam 105, in a manner known in the art, by an extent that is a function of the frequency of an electrical input to it. In the case of an electrical input having multiple frequency components, there will result multiple output beams at output angles that are functions of the frequencies of the separate components and in magnitudes that are functions (among other things) of the intensities of the separate components. Accordingly, two radio-frequency sources operating at two different frequencies (corresponding to the respective angular displacements of beams 103 and 104) are provided and modulated by rf modulator-generators 110 and 111, and their outputs are combined by summer 109, which is connected over line 108 to the acousto-optical modulator 12. The modulation of each beam's corresponding frequency component therefore results in modulation of each beam's intensity. Further details of a drum recorder using an acousto-optical modulator in this fashion are provided in U.S. Pat. Nos. 3,744,039 and 4,499,437.

The signals used to modulate the intensity of beams 103 and 104 are derived from output data from lookup tables 114 and 115 and converted into analog form by digital-to-analog converters 113 and 112 respectively. As will be described in further detail below, each lookup table contains, at addressable locations, output data defining the desired intensity of its respective beam as a function of input information that includes both picture intensity data (at the current position of the beam's target spot) and x-y coordinates defining the current location of the beam's target spot relative to a screen mesh disposed at a desired angle $\beta$ with respect to the u-v coordinate system. The picture intensity data identifies, at the current position of the beam's target spot, the intensity of the image from which the halftone is being created. The intensity of the beam is to be distinguished from this picture intensity data, and is determined in accordance with the output data in the lookup table, as just described.

The lookup table may be implemented in many different ways. In many systems, the table may be stored in memory of an appropriate size. The storage arrangement may, for example, be read-only memory (ROM) or read-write memory (typically RAM). Loading of the memory may be achieved using methods well-known in the art. If RAM is used, for example, it is possible to store on disk, tape, etc., a series of tables and to load a desired table into RAM at the time of use.

In general, of course, the x-y and u-v coordinate systems are distinct, and the distinct nature of these coordinate systems means that u-v coordinate information derived from shaft encoders 15 and 18 to identify the position of the beam's target spot will not access correct addresses in the lookup tables 114 and 115. The u-v coordinate information must instead be processed to derive applicable x-y coordinates of the target spot with respect to the rotated screen mesh. Such processing is achieved in the coordinate transformation unit 17, which has as an input the u- and v- coordinate related clock signals from shaft encoders 15 and 18 as well as calculation data 117 that includes constants and trigonometric functions of the angle $\beta$ to implement calculation in accordance with equation (2) of U.S. Pat. No. 4,499,489. The coordinate transformation may be accomplished in precisely the manner taught in such patent, so that x-y coordinates relative to the mesh are obtained as an output from the unit 17.

In cases wherein the number of rows and columns of microdots in a mesh is an integral power of 2, the foregoing U.S. Pat. No. 4,499,489 shows (in its FIG. 1, item 31 and FIG. 3) detailed implementation of the coordinate transformation unit 17, together with the delta x and delta y incrementation arrangement discussed below; the implementation in that patent is applicable to a three-beam system, and is readily modified to be applicable to a two-beam system. In cases wherein the number of rows and columns of microdots in a mesh is not an integral power of 2, each of the bit-stripping stages shown in FIG. 3 of the foregoing patent may be replaced by a suitable calculation stage that subtracts, from the absolute x'-y' coordinate output supplied by one of the boxes 63 or 64 respectively in FIG. 3, the applicable number of address periods, to result in a relative coordinate value that is not greater than the size of its respective address period.

Figure 5:
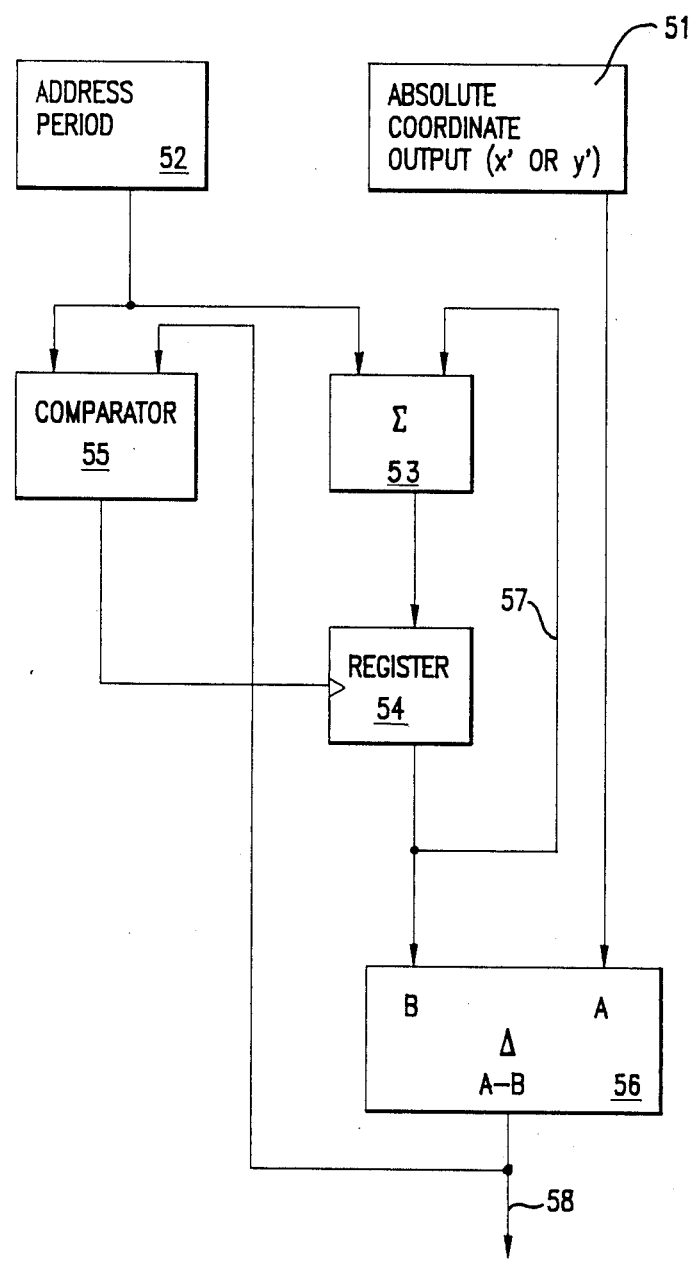
FIG. 5 is a block diagram of a calculation stage, for transforming absolute x'-y' coordinates to relative x-y coordinates, suitable for use with the embodiments of FIGS. 1 and 4.

One implementation of such a calculation stage is illustrated in FIG. 5. In this case, a separate calculation stage is used for each of the absolute x' and y' coordinates. The absolute coordinate output is shown here as item 51. The address period, provided as item 52, is the number of microdot rows or columns (depending on whether the relative x or y address is being calculated) that are addressable in the mesh. The address period is provided to a comparator 55 and to one input of a summer 53. The other input to the comparator 55 is derived from the output of the calculation stage, so that at any time the output of the calculation stage reaches the address period, the comparator 55 clocks the register 54. Initially, the register 54 is set to zero and, each time it is clocked, its output value is incremented by the address period, by virtue of feedback loop 57, from the register's output to the other input of summer 53, and also the communication of the output of summer 53 with the input of the register 54. The subtractor 56 subtracts, from the absolute coordinate value provided at input A, the value stored in register 54 provided at input B, so that the output 58 from the subtractor never exceeds the address period. It is also possible to provide other arrangements for deriving the relative x and y coordinates.

Because the displacement vector between the target spots of beams 104 and 103 is constant, each of the coordinates $(x_2, y_2)$ of the target spot of beam 104 differs by some constant amount (delta x, delta y) from the coordinates $(x_1, y_1)$ of the target spot of beam 103. Accordingly, the output of unit 17 provides $(x_1, y_1)$ as an input to lookup table 114, and the input $(x_2, y_2)$ to lookup table 115 is derived by adding (delta x, delta y) to $(x_1, y_1)$, and this sum is the coordinate input to lookup table 115.

The remaining input to the lookup tables here shown is picture intensity data 116 for the current location of the target spot. Depending on the resolution required, the same image data may be supplied to both lookup tables, assuming that the target spots of the beams 103 and 104 are sufficiently close together. On the other hand, resolution requirements might dictate that separate intensity data should be supplied to each lookup table.

Although separate lookup tables 114 and 115 are here shown for each beam 103 and 104, if the memory is sufficiently fast for the requirements established by other parameters of the system, it is possible to switch a single lookup table between two sets of inputs and outputs, one for each beam.

Although FIG. 1 has been described in connection with a two-beam system, its principles are equally applicable to a system having any number of beams or to a single beam system. Similarly, although FIG. 1 describes the amplitude modulation of a continuously produced laser output, the principles of the invention are equally applicable to other means of modulation and other radiation sources. The outputs of the lookup tables, or the modulating signals derived therefrom, may be strobed with pulses of constant width. Another option is to provide to the rf modulator-generators 110 and 111 a strobe pulse of constant amplitude but of variable duration controlled by output data from the lookup tables 114 and 115. Numerous other options are possible. For example, the light source may be pulsed light from a laser of relatively uniform power during each pulse, and the output data from the lookup table may control the duration of a pulse while the beam's target spot is at a given position. All these strategies are encompassed within the meaning of the term "to affect the intensity of the recording beam" as used in this description and in the following claims.

Moreover, because a radiation-sensitive medium such as film is not necessarily exposed when subject to low radiation levels, a low beam intensity may not produce an exposure. Accordingly as used below in this description and the following claims the term "off", in connection with a radiation beam's intensity, includes a nonzero beam intensity that is insufficient to cause exposure of the radiation-sensitive medium.

Figure 2:
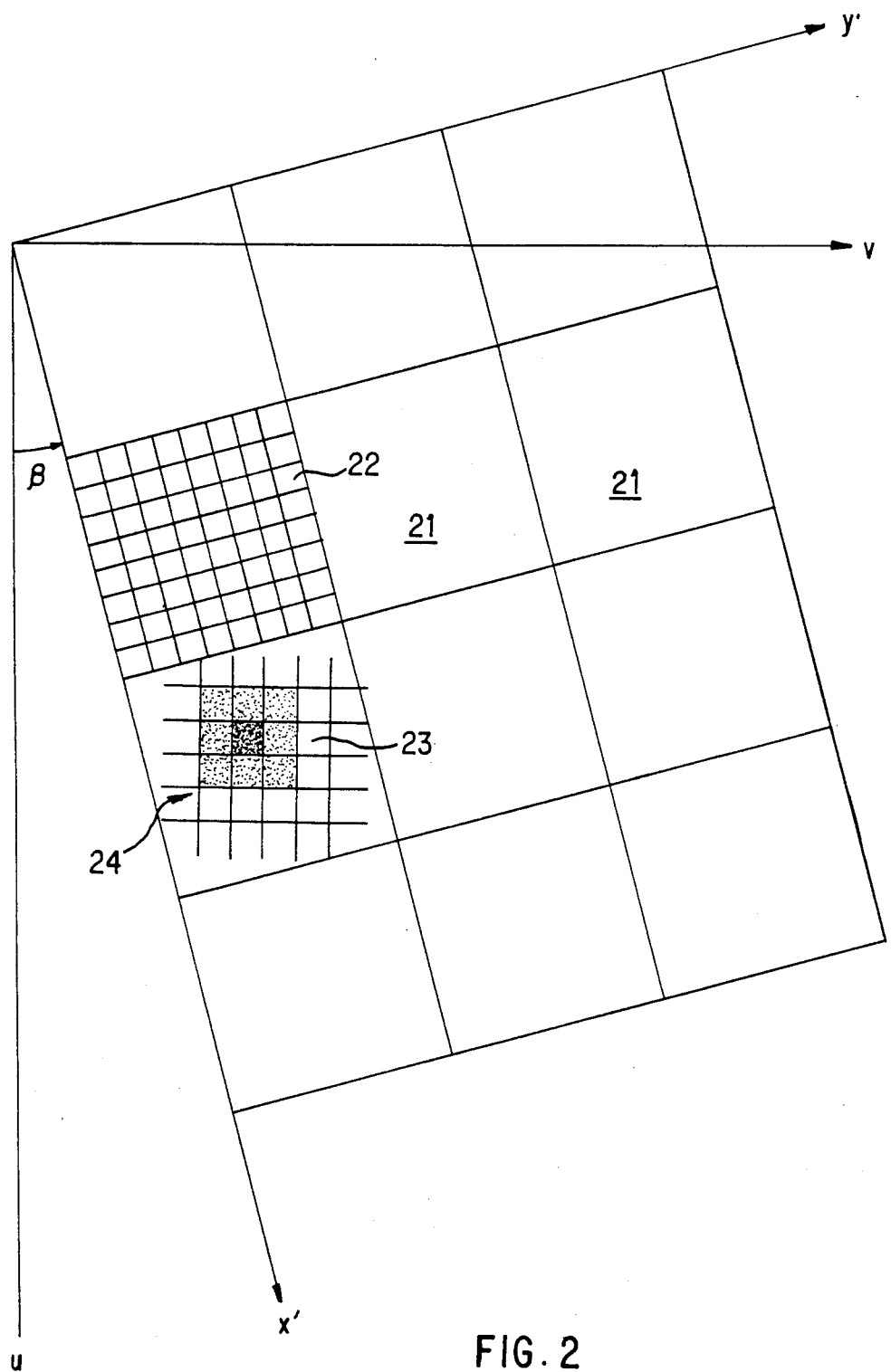
FIG. 2 shows, in relation to the embodiment of FIG. 1, the u-v coordinate system of the recording head and recording medium, the x'-y' coordinate system of a screen disposed at an angle with respect to the u-v system, as well as microdots into which the screen mesh is divided and target spot positions of a radiation beam.

FIG. 2 shows the u-v coordinate system of the recording head and recording medium and the x'-y' coordinate system of a screen disposed at an angle $\beta$ (which may be zero) with respect to the u-v recording system. The screen meshes 21 are repeated periodically over the entire film 14 of FIG. 1 to form a net, disposed at the angle $\beta$ with respect to the u-v coordinate system. Each of the screen meshes is divided into microdots 22, such as shown in the case of a single mesh in FIG. 2. Distinct from the microdots 22 are the positions 23 occupied by the target spots of the beams 103 and 104 as they are moved relative to the film 14. The target spots need not be the same size as the microdots 22, and here the target spots are somewhat larger than the microdots 22. The target spots are shown here as square for convenience of illustration, although in practice they may, for example, be round or elliptical, and the areas defined by successive positions of the target spots may overlap. FIG. 2 also shows the results of exposure of the target spot in different positions, with the largest exposure producing the blackened square in the matrix 24, a smaller exposure producing the hatched square, and the absence of exposure producing the white squares in the matrix.

Figures 3, 3A, 3B, 3C:
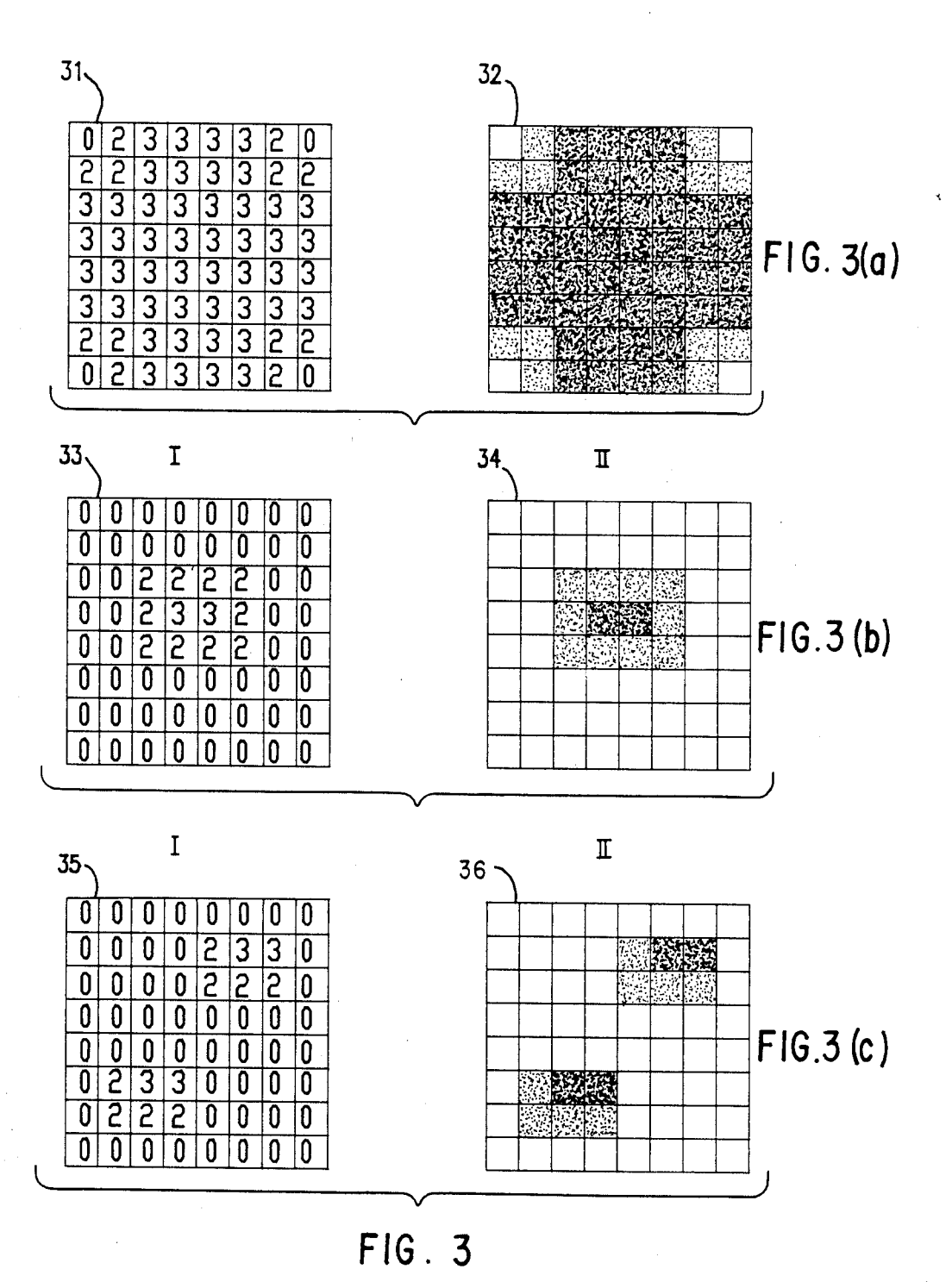

FIG. 3 illustrates the composition of a lookup table in accordance with the invention. In this example, each screen mesh is divided into an array of 8 microdots on each side and contains therefore a total of 64 microdots. This number is arbitrary and in practice may be larger. As described in connection with FIG. 2, each microdot is associated with an x-y coordinate position. Since the screen meshes are repeated periodically over the recording medium surface, the lookup table addresses output data as a function of the relative x-y position of the target spot. That is, the x position is modulo the number of microdots in a screen mesh lying parallel to the x-axis and the y position is modulo the number of microdots in a screen mesh lying parallel to the y-axis, the modulus in each case constituting the microdot address period along the pertinent axis. However, the lookup table has not two dimensions but a minimum of three, and the third dimension is addressed as a function of the intensity of the picture (from which the halftone is being generated) at the pertinent x-y position.

Shown in column I of FIG. 3 are the output values provided by a sample lookup table for all microdots in the mesh at each of three picture intensity values. It is assumed here that 32 possible picture intensity values are associated with the picture from which the halftone is being generated, although this number is arbitrary and in practice may be larger. In row (a) of column I is presented a chart 31 of output values provided by the lookup table for all microdots in the mesh assuming that the picture intensity value is at level out of 32. It can be seen that this particular chart shows possible output values of 0, 2, or 3. Thus gray-scale output, rather than mere binary output (print, no-print), is possible with the invention, although binary output is also possible, depending on the content of the lookup table.

In column II of FIG. 3 are shown the beam exposures on the recording medium for the mesh of column I. In this example, for purposes of illustration, the physical size of the exposure dot happens to be the same as that of the microdot, and the screen angle $\beta$ is zero. In row (a) of column II is presented a display of the exposure dots resulting from application of output values in chart 31 to an picture intensity value at level 25 for all microdot positions.

Similarly row (b) of FIG. 3 illustrates a chart 33 of output values and a display 34 of resultant beam exposures for a picture intensity value of level 5 out of 32. Row (c) of FIG. 3 illustrates a chart 35 of output values and a display 36 of resultant beam exposures for a picture intensity value of level 11 out of 32. Column II thus illustrates portions of a dot set provided by the lookup table for various intensity values. In the example given, it can be seen from row (c) that it is possible, if desired, to increase the screen dot frequency in the middle tones. It can also be seen that the invention permits the generation of soft dots, that is, dots with boundaries of graduated intensities.

The invention therefore affords great flexibility in design of the dot structure. As an additional example, it is possible to use soft dots for some picture intensity values and hard dots for other picture intensity values. In particular, the output data of the lookup table where hard dots are desired can be binary (on-off), and the output data where soft dots are desired can have three or more values. Because soft dots are more readily changed by chemical etching, controlling which picture intensity values are implemented with soft dots permits controlling which intensities can be changed by chemical etching. This approach can be used to assist i preserving gray balance in critical density areas that would otherwise be subject to the risk of color shift resulting from etching.

Figure 4:
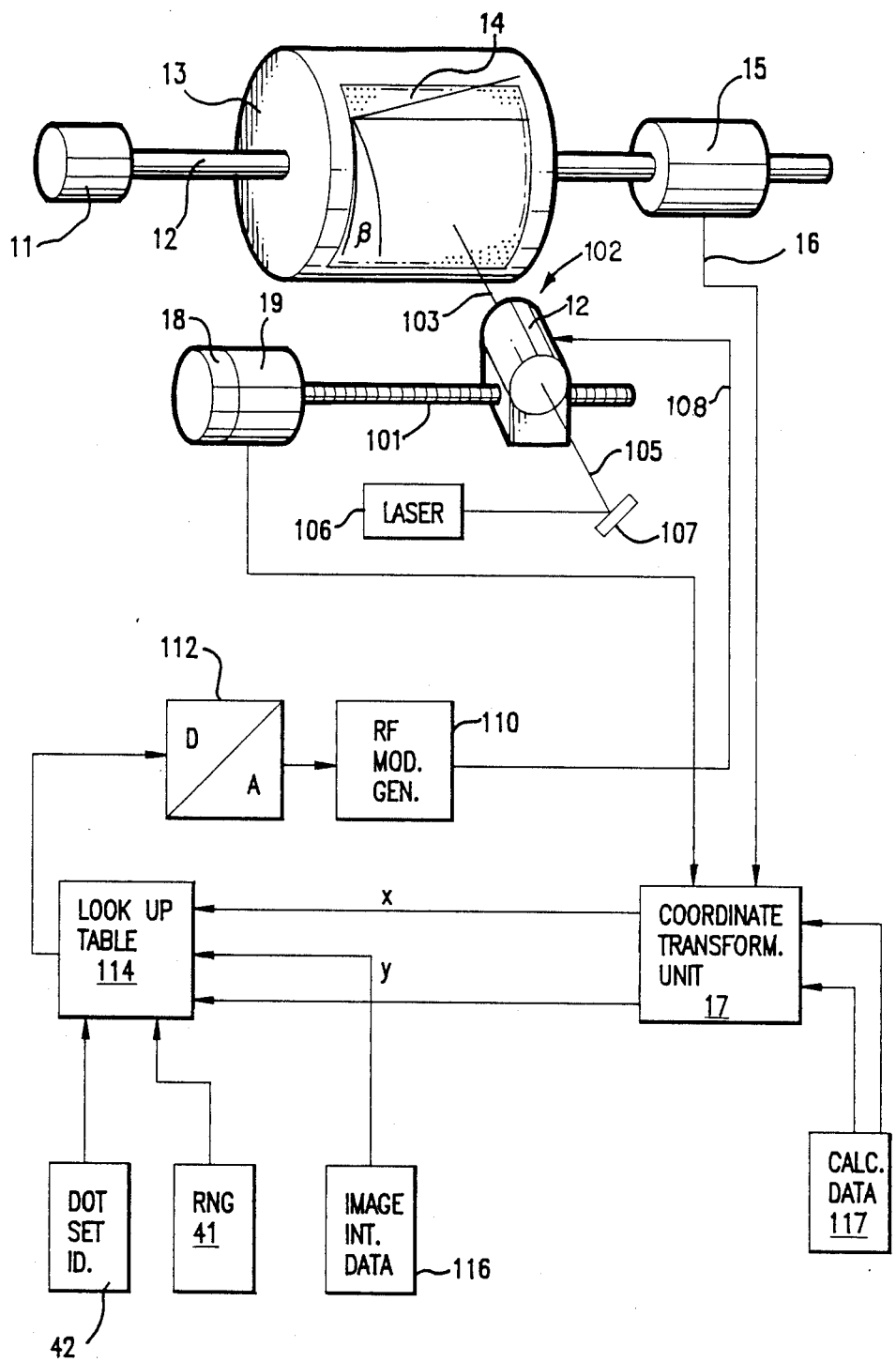
FIG. 4 is a block diagram of another preferred embodiment of an apparatus, for generating halftone images in accordance with the invention, in which dot set identification data and a generated random number are also used for addressing the look-up table.

FIG. 4 is a block diagram of another preferred embodiment of an apparatus (in the case using a single beam light source), for generating halftone images in accordance with the invention. More importantly, the lookup table 114 is here not three-dimensional but rather five-dimensional, the two new dimensions relating to dot set identification data and a generated random number. In other words, five parameters are necessary to address a given output datum: the two relative x-y coordinates, the picture intensity data 116, the dot set identifier 42, and a number from random number generator 41.

The dot set identifier serves to select a desired dot set. For example, a partial dot set is illustrated in column II of FIG. 3. This dot set is unusual owing to the variation in dot frequency in the middle tones. Another dot set might have a more customary single dot per mesh that grows in size with picture intensity. A further dot set may, for example, have only hard dots and no soft dots, regardless of picture intensity. Of course, a given dot set may exhibit any desired rate of dot growth or softness. The desired dot set may be selected with the dot set identifier.

In order to avoid auto-moire attributable to the systematic failure of microdots to coincide exactly with target spot positions, it may be desirable in some circumstances to randomly switch between very similar but not identical dot sets. For this purpose there is provided as an address input to the lookup table a number generated by random number generator 41. A suitable random number generator is described in *Electronics*, May 27, 1976, page 107. The similar dot sets can be designed, for example, so that random screen dot size variations occur in middle tones and random spatial shifting of dots occurs in low dot-size areas, and dark areas are unaffected.

Up to this point in the description of the invention, it has been assumed that the screen mesh has been rotated by an arbitrary angle $\beta$, and the coordinates in connection with which the lookup table is addressed are the x-y coordinates of the rotated screen mesh. These coordinates are determined, for example, by the coordinate transformation unit 17 of FIGS. 1 and 4. However, in the case of systems restricted to screen angles having a rational tangent, such as in U.S. Pat. No. 4,084,183, the microdots are typically addressed by unrotated coordinates that are based on u and v. To implement such an arrangement, it is known to produce a rectangular parcel or tile, having boundaries parallel to the u and v axes. As shown in the foregoing patent, the parcel is divided into microdots, and is repeated periodically in two dimensions, and contains the screen structure.

The present invention may be implemented with respect to rational tangent systems to provide soft dots and selectable dot sets, and random dot set selection. In such a case, there is created a lookup table providing output data that relate to multivalued beam radiation intensities. That is, the beam at any exposure dot may be one of three or more intensities. (Typically one of the intensities will be off.) The lookup table's output data are accessed by address information including picture intensity and relative u-v coordinates (which may be scaled if necessary) modulo the applicable address periods of the parcel on the u and v axes.

As used in the description and claims below, the term "screen portion" includes both a parcel as just described above as well as a screen mesh in the arbitrary angle system described in connection with FIGS. 1 and 4. The "portion coordinate system" used to access a microdot in a screen portion may therefore be the relative u-v system in the case of rational tangent screening or the relative x-y system in the case of an arbitrary angle system. The portion coordinate system is referred to generally as the r-s coordinate system, and is relative to a portion.

It will be clear to the reader skilled in the art that the invention may be embodied in a variety of forms. For example, some of the functions performed in accordance with the invention may be implemented in a general purpose computer programmed for the purpose. These functions may include coordinate transformation and the lookup table(s).

Furthermore, although output data in the lookup table is addressed on the basis of the relative r-s coordinates identifying beam target spot position, the table can in fact be condensed in common instances wherein the screen portion is symmetrical. For example, in the case of bilateral symmetry with respect to both the r and the s axes, only one quadrant of information for each screen portion need be stored in the lookup table. When the portion coordinates refer to one of the other three quadrants, a simple transformation causes the output for the corresponding address in the stored quadrant to be accessed.

A suitable transformation for the r coordinate is in most cases given by $r_a = r$, when $r \leq r_{max}/2$ $r_a = r_{max} - r$, when $r > r_{max}/2$, where
  $r_a$ is the r component of the lookup table address;
  r would be the r component of the lookup table if it were not condensed; and
  $r_{max}$ is the maximum possible value of r in such an uncondensed table.

A similar transformation may be utilized for s.

What is claimed is:

1. An improved method for generating a half-tone having a desired screen angle and screen frequency using a recording means having a radiation beam, of variable intensity, aimed at a target spot on a recording medium, the target spot being moved relative to the recording medium in first and second directions defining a first coordinate system,
    wherein the recording medium is divided into a number of periodically repeating screen meshes forming a net on which locations are defined by a second coordinate system and wherein one of the coordinates of the second coordinate system is disposed at an angle $\beta$ with respect to the first recording direction,
    wherein each of these screen meshes is divided into a number of microdots, and
    wherein the relative position of the target spot in any given mesh containing the spot is defined by relative second coordinates determined as a function of the spot's position in the coordinates of the first coordinate system
    wherein the improvement comprises:
    providing a lookup table that contains, at addressable locations, output data defining the desired intensity of the radiation beam as a function of input information, including the relative second coordinates and picture intensity data, such input information defining an address in the table,
    addressing the lookup table on the basis of such information, and
    using the output data of the lookup table to affect the intensity of the radiation beam.

2. A method according to claim 1, wherein the radiation beam is a laser beam, its intensity is controlled by a modulator, and the step of using the output data of the lookup data to affect the intensity of the recording beam includes supplying the output of the lookup table to the modulator.

3. A method according to claim 1, wherein the step of providing a lookup table includes providing a lookup table containing output data that defines the desired radiation beam intensity as one of at least three intensities.

4. A method according to claim 1, wherein the step of providing a lookup table includes providing such a table containing output data as a function of input information that further includes at least one of (a) a desired dot shape set and (b) a random number.

5. A method of according to claim 2, wherein the step of providing a lookup table includes providing such a table containing output data as a function of input information that further includes at least one of (a) a desired dot shape set and (b) a random number.

6. A method according to claim 3, wherein the step of providing a lookup table includes providing such a table containing output data as a function of input information that further includes at least one of (a) a desired dot shape set and (b) a random number.

7. An improved method for generating a half-tone having a desired screen angle and screen frequency using a recording means having a radiation beam, of variable intensity, aimed at a target spot on a recording medium, the target spot being moved relative to the recording medium in first and second directions, wherein the recording medium is divided into a number of periodically repeating screen portions, each portion including at least one mesh, forming a net of meshes, the meshes having an axis disposed at an angle $\beta$ with respect to the first recording direction, wherein each of these portions is divided into a number of microdots accessed by a pair of portion coordinates, and wherein the relative position of the target spot in any given portion containing the spot is defined by relative portion coordinates, wherein the improvement comprises:

providing a lookup table that contains, at addressable locations, output data defining the desired intensity of the radiation beam, as one of at least three intensities as a function of input information, including the relative portion coordinates and picture intensity data, such input information defining an address in the table, addressing the lookup table on the basis of such information, and using the output data of the lookup table to affect the intensity of the radiation beam.

8. A method according to claim 7, wherein the radiation beam is a laser beam, its intensity is controlled by a modulator, and the step of using the output data of the lookup data to affect the intensity of the recording beam includes supplying the output of the lookup table to the modulator.

9. A method according to claim 7, wherein $\beta$ has a rational tangent.

10. A method according to claim 7, wherein the step of providing a lookup table includes providing such a table containing output data as a function of input information that further includes at least one of (a) a desired dot shape set and (b) a random number.

11. A method of according to claim 9, wherein the step of providing a lookup table includes providing such a table containing output data as a function of input information that further includes at least one of (a) a desired dot shape set and (b) a random number.

12. An improved apparatus for generating a half-tone having a desired screen angle and screen frequency using a recording means having a radiation beam, of variable intensity, aimed at a target spot on a recording medium, the target spot being moved relative to the recording medium in first and second directions defining a first coordinate system, wherein the recording medium is divided into a number of periodically repeating screen meshes forming a net on which locations are defined by a second coordinate system and wherein one of the coordinates of the second coordinate system is disposed at an angle $\beta$ with respect to the first recording direction, wherein each of these screen meshes is divided into a number of microdots, and wherein the relative position of the target spot in any given mesh containing the spot is defined by relative second coordinates is determined as a function of its position in the coordinates of the first coordinate system, wherein the improvement comprises:

storage means for storing, at addressable locations, output data defining the desired intensity of the radiation beam as a function of input information, including the second coordinates and picture intensity data, such input information defining an address in the storage means, address means for addressing the storage means on the basis of such information, and affect means, in communication with the storage means, for affecting the intensity of the radiation beam based on the output data of the storage means.

13. An apparatus according to claim 12, wherein the storage means includes means for storing output data that defines the desired radiation beam intensity as one of at least three intensities.

14. An apparatus according to claim 12, wherein the radiation beam is a laser beam, and the affect means includes a modulator for controlling the intensity of the laser beam.

15. An apparatus according to claim 12, wherein the storage means includes means for storing output data as a function of input information that further includes at least one of (a) a desired dot shape set and (b) a random number.

16. An apparatus according to claim 13, wherein the storage means includes means for storing output data as a function of input information that further includes at least one of (a) a desired dot shape set and (b) a random number.

17. An apparatus according to claim 14, wherein the storage means includes means for storing output data that defines the desired radiation beam intensity as one of at least three intensities.

18. An improved apparatus for generating a half-tone having a desired screen angle and screen frequency using a recording means having a radiation beam, of variable intensity, aimed at a target spot on a recording medium, the target spot being moved relative to the recording medium in first and second directions, wherein the recording medium is divided into a number of periodically repeating screen portions, each portion including at least one mesh forming a net of meshes, the meshes having an axis disposed at an angle $\beta$ with respect to the first recording direction, wherein each of these portions is divided into a number of microdots, accessed by a pair of portion coordinates, and wherein the relative position of the target spot in any given portion containing the spot is defined by relative portion coordinates, wherein the improvement comprises:

storage means for storing, at addressable locations, output data defining the desired intensity of the radiation beam, as one of at least three intensities, as a function of input information, including the relative portion coordinates and picture intensity data, such input information defining an address in the storage means, address means for addressing the storage means on the basis of such information, and affect means, in communication with the storage means, for affecting the intensity of the radiation beam based on the output data of the storage means.

19. An apparatus according to claim 18, wherein the radiation beam is a laser beam, and the affect means includes a modulator for controlling the intensity of the laser beam.

20. An apparatus according to claim 18, wherein $\beta$ has a rational tangent.

21. An apparatus according to claim 18, wherein the storage means includes means for storing output data as a function of input information that further includes at least one of (a) a desired dot shape set and (b) a random number.

22. An apparatus according to claim 20, wherein the storage means includes means for storing output data as a function of input information that further includes at least one of (a) a desired dot shape set and (b) a random number.

* * * * *